Nov. 23, 1948.                    W. E. KNAPP                    2,454,461
                             TRACTOR MOUNTED LOADER
Filed July 2, 1945                                              3 Sheets-Sheet 1
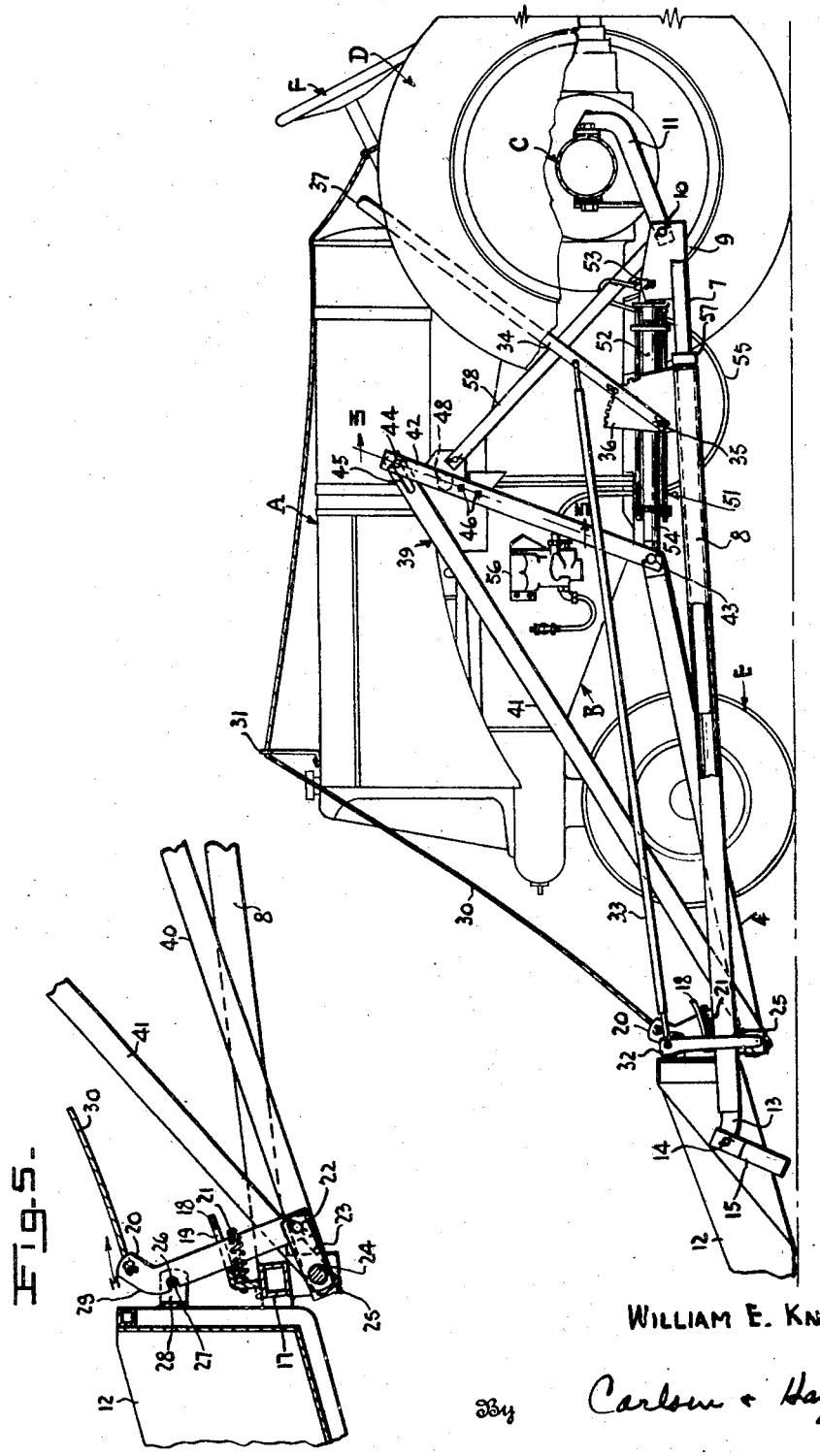
Inventor
WILLIAM E. KNAPP
By Carlson & Hazle
   Attorney

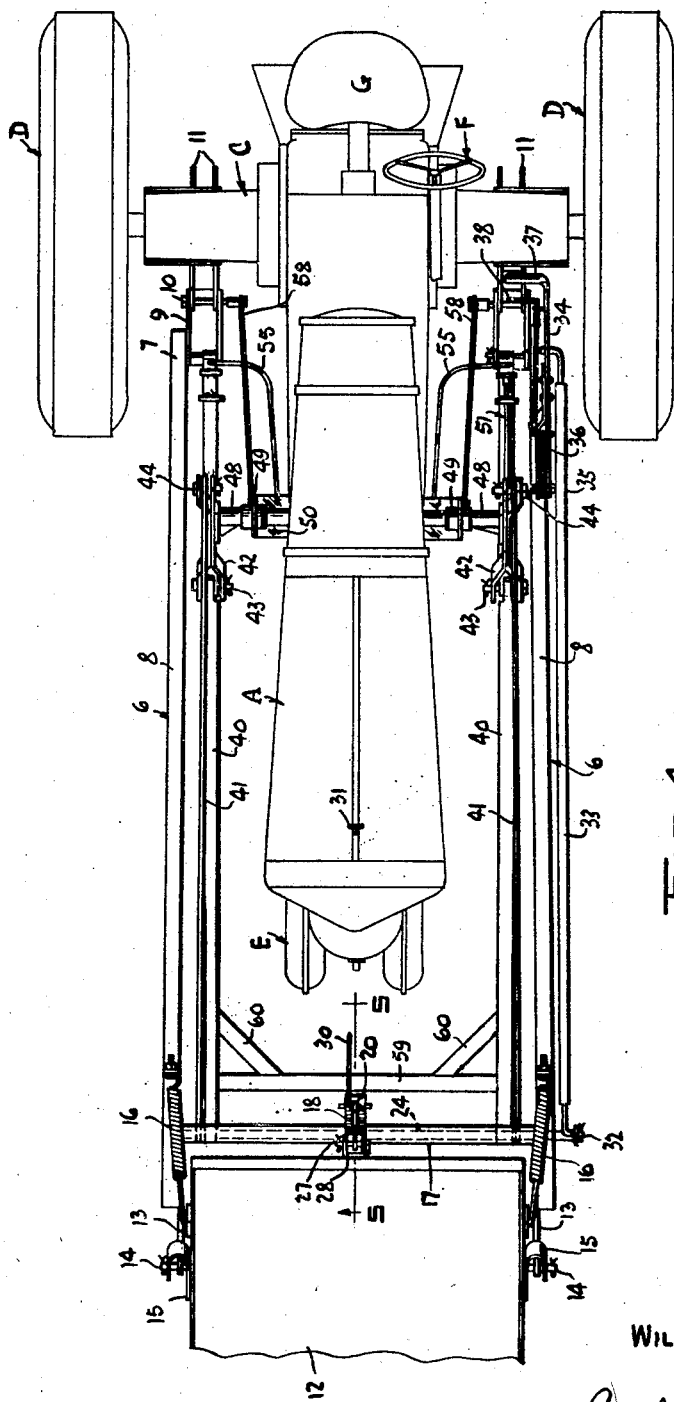

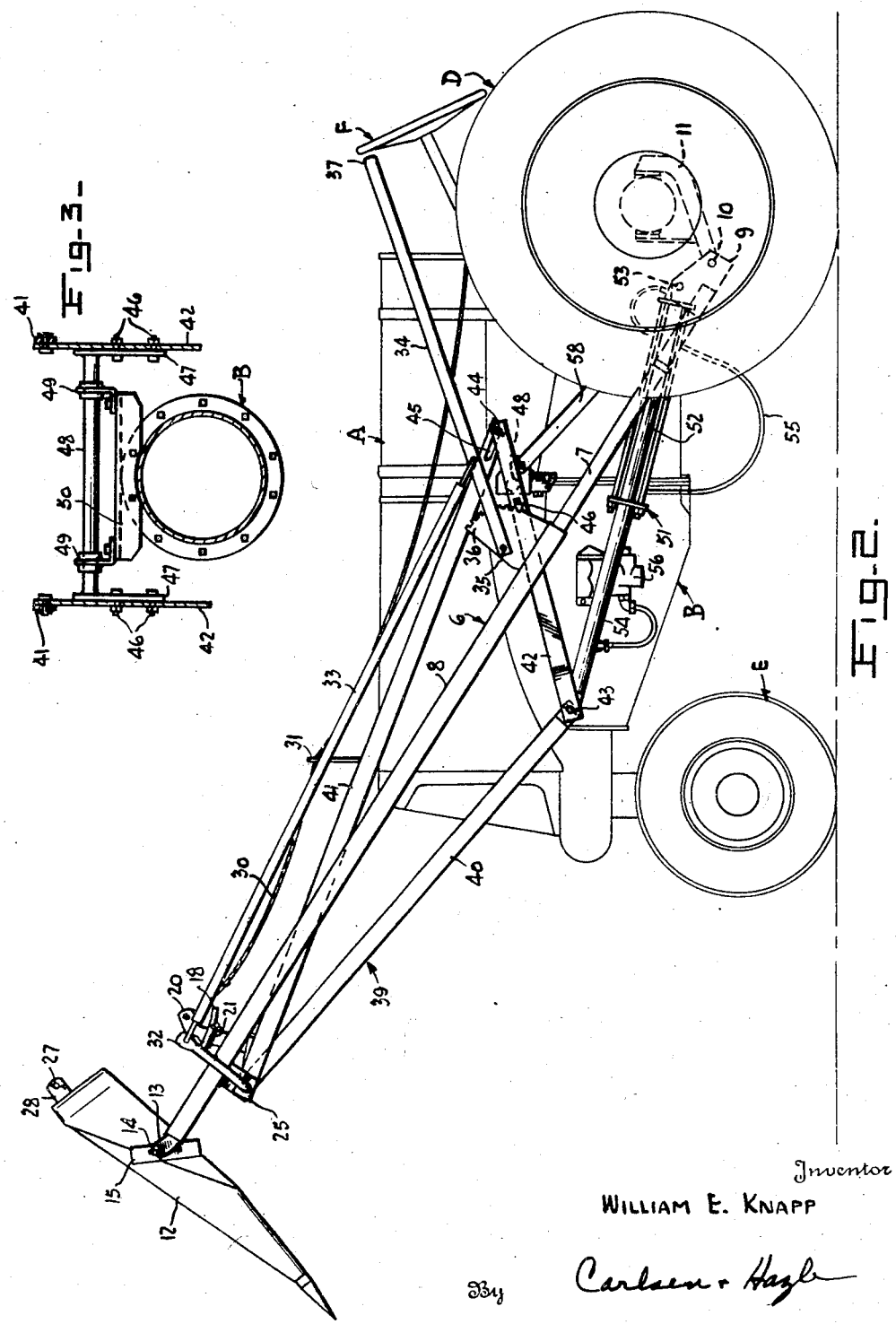

Patented Nov. 23, 1948

2,454,461

UNITED STATES PATENT OFFICE 2,454,461

TRACTOR MOUNTED LOADER

William E. Knapp, Moline, Ill., assignor to Minneapolis-Moline Power Implement Company, Minneapolis, Minn., a corporation of Delaware Application July 2, 1945, Serial No. 602,784

3 Claims. (Cl. 214—141)

1

This invention relates to tractor mounted loaders and the primary object is to provide a comparatively simple, efficient, and practical loader which is particularly an improvement in the type of hydraulic loader design disclosed in the co-pending application of Paul P. Wuertz and Elmer J. Wuertz, Serial No. 541,322, now Patent No. 2,404,820, granted July 30th, 1946 for Loader.

More specifically the present invention contemplates an improved arrangement of lifting mechanism in which the hydraulic jacks or lift units are disposed in such position that they will operate from or directly against the rear axle structure of the tractor; which, with corresponding changes and essential rearrangement of other parts, facilitates mounting and dismounting the attachment with respect to the tractor, provides a simpler and sturdier construction, and affords better access to the engine and other tractor parts, all of which are important considerations from the standpoints of manufacturing costs, ease and simplicity of operation, and servicing of both tractor and lift mechanism.

The aforesaid and still other and more detailed objects and advantages will be disclosed in the course of the following specification, reference being had to the accompanying drawings, wherein:

Fig. 1 is a side elevation, with fractional parts broken away, of a tractor mounted loader embodying the present invention, the load carrier being shown in its lowermost position.

Fig. 2 is a side elevation of the tractor-loader complete and with the load carrier in its raised and dumping position.

Fig. 3 is a detail sectional elevation on line 3—3 in Fig. 1.

Fig. 4 is a plan view of the machine.

Fig. 5 is an enlarged detail elevation on line 5—5 in Fig. 4.

Referring to the drawings more particularly and by reference characters, A designates generally a tractor of conventional and well known design, and includes a generally longitudinal housing B containing engine and transmission mechanism, and a rear axle housing C extending laterally for support on large rear traction wheel D, while the front end of the tractor is supported on more closely spaced wheels E that are controlled by steering wheel F within convenient reach of the operator's station G.

The loader mechanism which is detachably secured to the tractor for ready removal and reattachment, includes a pair of laterally disposed booms 6 that extend from the rear axle housings

2

C to points forwardly beyond the front wheels E. Each of these booms is made of telescopically associated sections 7 and 8. The rear end of the inner sections, 7, are rigidly connected to plates 9 that are pivoted as at 10, to brackets 11 that are rigidly secured to and extend a short distance forwardly and below the axle housings C. Thus the forward ends of the booms, which directly support a load carrier 12, may swing in vertical, longitudinal planes.

Arms 13 extend rigidly from the forward ends of boom sections for pivotal connection at 14 with U-shaped clips or brackets 15 on the carrier unit 12. The upper ends of these brackets may stop against the arms 13 to limit rearward tilting movement of the carrier to position shown in Figs. 1 and 5. The carrier 12 is here shown in the form of a scoop or shovel, but may obviously be otherwise constructed depending upon the type of use it is put to or the kind of material to be handled.

The load carrier unit 12 is yieldably urged toward its up or loading position by one or more counterbalancing springs 16 which connect the carrier to the boom sections 8. The principal purpose of these springs is to facilitate return of the carrier to its loading position, and it is not the intention that these springs should be of such strength as to prevent or interfere with gravity dumping of the loaded scoop when the holding latch is released.

Immediately rearward of the scoop 12 the boom sections 8 are connected by a cross beam 17, the same being welded at both ends to the sections so as to give as much rigidity as possible to the lift booms. This cross beam supports a keeper 18 having a slot 19 in which operates a latch lever 20, such lever being yieldably held in a forward position in the slot by springs 21. The lower end of the lever is pivoted, at 22, to an arm 23 of a shaft 24 journaled in bearing ears 25 extending downwardly from the boom sections 8.

Near its upper end the latch lever 20 has a keeper notch 26 adapted to receive a latch pin 27 secured in ears 28 extending from the rear wall of the scoop 12; and, above the notch 26 the latch has a cam edge 29 arranged to be engaged by the pin, when the scoop is tilted to loading position, so as to automatically lock the scoop until it is again to be dumped. A pull rope 30 extends from the latch back through a guide 31 on the front end of the tractor and thence to a point within convenient reach of the tractor operator.

The latch lever 20 also operates to maintain the scoop in any desired adjustable loading position. Thus, the shaft 24 which mounts the arm 23, has a crank 32 at one end and this crank is connected by a rod 33 to a hand lever 34. The latter is pivoted at 35 to a toothed segment 36 mounted on the rear end of boom section 8, and a handle 37 with release latch 38 extends to within reach of the operator's station. It will thus be seen that by adjusting hand lever 34 on segment 36 the rod 33 will swing arm 32 to oscillate shaft 34 and thereby raise and lower arm 23 and latch 20 to tiltably adjust the latched position of the carrier scoop 9.

Referring now to the lift mechanism proper, at each side of the tractor there is a triangular frame 39 made up of a push bar 40, a tie bar 41, and an oscillatable lever 42. The two bars 40 and 41, (of each set) are secured at their front ends to the shaft 34, while the rear end of the bars are respectively pivoted to the lower and upper ends of the lever 42, as at 43 and 44, the pin 44, however, being free to move in a slot 45 in arm 41.

The levers 42 are releasably secured by bolts 46 (see Fig. 3) to the arms 47 of a lifting roll or shaft 48. This roll or shaft 48 is journaled in bearings 49 on a bracket 50 secured crosswise upon the tractor casting B.

The lifting jacks 51 each comprises a cylinder unit 52, pivoted at its rear end at 53 to the plate 9, and a piston 54 attached to the pivot connection 43 between members 40 and 42. The cylinders are provided with pressure fluid medium through tubes 55 extending from a pump 56 and suitable valve control mechanism (not shown) is provided whereby the operator may control the flow of fluid pressure to the jacks in common and well known manner.

The operation of the machine, while possibly understood from the foregoing, may be described as follows:

When the carrier or scoop 12 is to be loaded it is lowered to the ground level as shown in Fig. 1, at which time the boom section 8 abuts against a stop collar 57 on the section 7. The tractor is then driven forward until the scoop 12 penetrates well into or under the manure, dirt or other material to be loaded, and is then stopped. The rearward stress on the booms, due to the resistance of the material, is conveyed to the rear axle housing C through bracket 11 which are in turn braced by forwardly and upwardly extending tie bars 58. The most effective working or digging angle of the scoop is regulated by the lever 34.

The operator now opens the necessary valve or valves to admit fluid under pressure to the cylinders 52. This projects the pistons 54 which in turn actuate the triangular lift frames 39 in a clockwise direction about the axis of roll 48, as viewed in Fig. 1. The resulting action on the booms 6 is to extend the sections 8 forwardly while also lifting them upwardly about pivot centers 10. The component of these movements is such that the scoop 12 will be elevated and moved forwardly with respect to the tractor in a compound or graduated curve that will bring it as far forwardly as possible and to thereby give it maximum clearance forwardly of the tractor, when fully raised, for dumping purposes.

It will also be noted that the parts are so arranged that the leverage will exert greatest lift power on the scoop at the beginning of its upward stroke, because at such time (Fig. 1) the hydraulic jack 54 is more nearly at right angles to the lever 42 than it is at the end of its lift movement (Fig. 2). Thus the device can better break loose the load at which time most force is needed, it also being understood that the lift force at such time is that which is transmitted through the relatively short upper arm of the lever 42 and the pull bar 41. In the upward movement and particularly after the boom 6 passes above the pivot center 43 the vertical lift work is effected in large measure by push action through the bar 40.

When the desired dumping elevation is reached, the tractor first having traveled or turned to dumping position, the operator merely pulls the trip cord 30 to release the latch 20 whereupon the weight of the load, forward of the centers 14, will cause the scoop to tilt and drop its contents. The springs 16 will then restore the scoop to its initial position, or if they are not sufficiently strong to do so then it is a simple matter to restore the scoop by lowering the booms until ground contact with the forward end of the scoop re-engages the latch. When lowering the scoop it is found that occasionally the scoop, booms, or frames will contact an obstruction that will tend to bend or buckle the lift bars 41 and for that reason they have been provided with the slots 45 which will permit them to move back on the pins 44, and the slack thus provided will in no way interfere with the normal operation or function of the bar. Lowering of the lift mechanism is of course effected by merely releasing the pressure in the cylinders 52.

During normal operation of the machine there are, in addition to the vertical lift stresses and strains, diagonal and transverse strains that tend to shift and twist the lift frames, and to counteract this tendency forward end portions of the push bars 40 are connected by a beam 59 and diagonal braces 60 (Fig. 4) all rigidly welded together. This construction renders it unnecessary to provide guide devices at the forward end of the tractor.

When the lift mechanism is to be temporarily removed, as when it is desired to use the tractor for other purposes it is only necessary to remove the pins 10 and bolts 46, and disconnect the fluid supply tubes 55. This frees the entire loading apparatus and it can be just as easily re-installed by reversing the process.

It will thus be seen that the loader is not only extremely compact and efficient but also so constructed that it provides ample clearances for getting at and servicing the tractor when it is attached.

It will further be understood that various modifications may be made in the general design and structural details of the machine as herein disclosed providing such modifications come within the spirit and scope of the appended claims. Having now therefore fully shown and described the invention, what I claim to be new and desire to protect by Letters Patent is:

1. In a tractor mounted loader, a longitudinally extending boom disposed at each side of the tractor, each boom comprising two telescopic sections the rear one of which is pivoted at its rear end on the tractor and supporting the forward section for up and down movements at its forward end, a load carrier supported by the forward ends of the booms, a swinging frame structure supported on the tractor above each boom, and including a power lift actuated member connected to the forward section of the boom to raise the same, each frame structure also including a longitudinally extended push bar connected to said forward section of the boom and movable forwardly during a part of the lifting operation to extend the boom in a forward direction, and a generally horizontal fluid actuated piston and cylinder device connected at one end to the swinging frame structure and at its other end to the tractor.

2. A tractor mounted loader comprising in combination, a telescopic boom disposed lengthwise alongside the tractor and pivotally supported at its rear end thereon for up and down movements at its forward end, a substantially triangular lifting frame pivotally supported on the tractor above the boom, said frame comprising a pivoted lever having upper and lower ends, a lifting member connected between the forward end portion of the boom and the upper end of the lever, and a pushing member connected between the said forward end portion of the boom and the lower end of the lever, and power operated means for oscillating the frame about its pivot to lift the boom by said lifting member, said power operated means including a fluid actuated jack connected at one end to the lower end of the lever and at its other end to the tractor at a point rearwardly of the lever.

3. A tractor mounted loader comprising in combination, a telescopic boom disposed lengthwise alongside the tractor and pivotally supported at its rear end thereon for up and down movements at its forward end, a substantially triangular lifting frame pivotally supported on the tractor above the boom, said frame comprising a pivoted lever having upper and lower ends, a lifting member connected between the forward end portion of the boom and the upper end of the lever, and a pushing member connected between the said forward end portion of the boom and the lower end of the lever, and power operated means for oscillating the frame about its pivot to lift the boom, said lifting member comprising a rigid bar having freedom for limited endwise movement with respect to the lever.

WILLIAM E. KNAPP.

REFERENCES CITED

The following references are of record in the file of this patent:

UNITED STATES PATENTS

| Number | Name | Date |
| --- | --- | --- |
| 1,477,136 | Laurie | Dec. 11, 1923 |
| 1,527,251 | Furst | Feb. 24, 1925 |
| 1,913,472 | Blumberg et al. | June 13, 1933 |
| 2,126,791 | Low | Aug. 16, 1938 |
| 2,286,947 | Bankson | June 16, 1942 |
| 2,287,375 | Ford, Jr. | June 23, 1942 |
| 2,295,917 | Schwan | Sept. 15, 1942 |
| 2,300,801 | Parker | Nov. 3, 1942 |
| 2,301,102 | Werthman et al. | Nov. 3, 1942 |
| 2,306,313 | Johnson | Dec. 22, 1942 |
| 2,363,986 | Mott | Nov. 28, 1944 |
| 2,371,273 | Walker | Mar. 13, 1945 |
| 2,387,656 | Gledhill | Oct. 23, 1945 |
| 2,391,224 | Carter | Dec. 18, 1945 |
| 2,393,435 | Wachter | Jan. 22, 1946 |
| 2,404,820 | Wuertz et al. | July 30, 1946 |
| 2,405,114 | Coats | Aug. 6, 1946 |
| 2,415,892 | Koehl et al. | Feb. 18, 1947 |
| 2,433,086 | Borgelt | Dec. 23, 1947 |